United States Patent [19]

Tanaka et al.

[11] 4,015,154

[45] Mar. 29, 1977

[54] MOTOR AND METHOD FOR MAKING SAME

[75] Inventors: Sadao Tanaka, Machida; Kiyosi Endo; Fumio Karakawa, both of Yokohama, both of Japan

[73] Assignee: Sony Corporation, Tokyo, Japan

[22] Filed: Dec. 12, 1975

[21] Appl. No.: 640,337

Related U.S. Application Data

[63] Continuation of Ser. No. 535,794, Dec. 23, 1974, abandoned.

[30] Foreign Application Priority Data

July 3, 1975  Japan ................................ 70-4188

[52] U.S. Cl. ................................ 310/42; 29/596; 264/331; 310/43; 310/89; 310/217; 310/254
[51] Int. Cl.² .................... H02K 5/02; H02K 15/02
[58] Field of Search .................... 29/596, 598, 609; 310/42, 43, 217, 216, 254, 259, 89; 264/331

[56] References Cited

UNITED STATES PATENTS

| | | |
|---|---|---|
| 2,354,551 | 7/1944 | Sawyer ................................ 29/596 |
| 2,607,816 | 8/1952 | Ryder et al. ........................ 29/596 |
| 2,695,969 | 11/1954 | Yates .................................... 29/596 |
| 3,194,993 | 7/1965 | Hackney et al. ..................... 310/43 |
| 3,701,748 | 10/1972 | Kroekel .............................. 264/331 |
| 3,827,141 | 8/1974 | Hallerback .......................... 29/596 |
| 3,932,929 | 1/1976 | Hallerback et al. ................. 29/596 |

*Primary Examiner*—Carl E. Hall
*Attorney, Agent, or Firm*—Lewis H. Eslinger; Alvin Sinderbrand

[57] ABSTRACT

In a method for making a motor, wherein a plurality of lamellar ring plates each having plural teeth extending outwardly from its inner ring portion are laminated, coils are wound on every tooth, and then inserted in a ring which are also made of a plurality of laminated lameller ring plates so as to cover all openings between teeth and thereby a stator is formed. After that, the stator is molded with resin comprising mainly the mixture of thermoplastic resin and thermosetting resin. And then, a rotor is inserted into the stator after cutting off the inner ring portions of the stator to form the motor.

4 Claims, 9 Drawing Figures

MOTOR AND METHOD FOR MAKING SAME

This is a continuation of application Ser. No. 535,794, filed 12-23-74 now abandoned.

BACKGROUND OF THE INVENTION

1. Field of the Invention

The present invention relates generally to a method for making a motor, and more particularly to a method for making a motor with less steps and high accuracy.

2. Description of the Prior Art

Up to now, there have been generally proposed the following two methods for making a motor.

a. A first method for making a motor is as follows:

A plurality of lamellar ring-shaped plates each having a plurality of pole pieces or teeth extending inwards are piled up as to form a stator core, coils are wound on every tooth of the resulting laminated stator core by hand or winding machine, or coils which are previously wound without cores are inserted into the teeth of the stator core by hand or an automatic inserting machine, and then the stator core is impregnated with varnish to be the final stator. Then, the stator is molded with conventional resin to be a drum shaped casing and thereafter a bracket and a rotor are attached to the stator to form the motor.

b. A second method for making a motor is as follows;

A plurality of laminated pole pieces are secured at regular angles on the periphery of a drum-shaped jig having a predetermined diameter, and stator coils are wound on them. After that, the outer edges of all of the pole pieces are coupled with laminated ring plates to be a stator, and then the thus formed stator is molded with conventional resin in the same manner as in the first method.

In the first method, there exist some difficulties in the winding or inserting process of the stator coils on the stator core. That is to say, it is very difficult to wind the stator coils on the pole pieces which extend inwards of the stator core.

The second method requires many steps. Further, a problem common to both the methods is that accuracy in the manufacture of the casing of the motor or molding body for the motor is low and hence there is often an eccentricity between the stator and the rotor of the completed motor. Therefore, the vibration noise of the rotor and the vibration of the stator coils due to the insufficient fluidity of the molding compound for the casing cause an undesirable noise and overheating of the motor. Further, the expected power can not be obtained under such circumstances.

SUMMARY OF THE INVENTION

According to the present invention, there is proposed a method for making a motor which comprises the steps of disposing coils on every tooth portion extending outwardly from the periphery of a connecting ring portion of a first laminated ring plate, inserting first laminated ring plate with the coils into a second laminated ring plate, molding the combined first and second laminated ring plates with resin composed of mainly the mixture of thermoplastic resin and thermosetting resin, and inserting a rotor into the resulting molded body.

Accordingly, it is an object of the present invention to provide a novel method for making a motor.

It is another object of the invention to provide a method for making a motor in which a molding casing is prepared such that the motor can be easily assembled.

It is a further object of the invention to provide a method for making a motor of high property due to molding of high accuracy.

It is a still further object of the invention to provide a method for making a motor in which the casing of the motor is closed and a resin of good fluidity is used for the casing to reduce a noise of the motor and to avoid overheating of the motor.

DESCRIPTION OF THE PREFERRED EMBODIMENT

Figure 1:
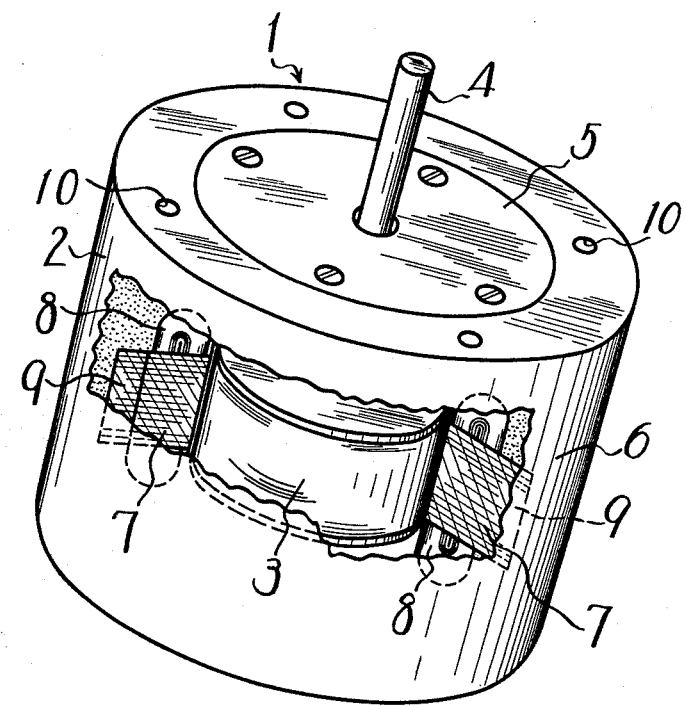
FIG. 1 is a perspective view, partially taken away, showing a molded motor made by a method according to the present invention.

In FIG. 1 which shows an example of a molded motor 1 with a fragment of the wall removed to show some of the inner parts. The motor 1 is made by an example of the method according to the present invention. The motor includes a casing 2 formed by molding electrical and magnetic parts with a resin which will be described later in detail. The casing 2 has an opening (described later) at one end. A rotor 3 of well known structure is rotatably mounted inside of the casing 2. A rotor shaft or motor shaft 4 extends outwards through a cover or bracket 5 which is also formed by a molding method of the invention described later and attached to the casing 2 to close the opening thereof. A stator 6 consists of pole pieces 7 which are made by laminating a plurality of pole piece elements, coils 8 wound on the laminated pole pieces 7, and a ring core 9 which is made by laminating a plurality of ring core elements. The construction and molding method of the stator 6, the casing 2 into which the stator 6 is inserted, and the bracket 5 which closes the opening of the casing 2 will become apparent from the description given later. Further, in FIG. 1, reference numeral 10 represent holes or screw holes which are used for assembling the motor 1 to the chassis of a device or the like. The bracket 5 is attached to the casing 2 by several screws.

The process for preparing the respective elements which may be used to construct the stator 6 and the winding of the coils 5 will be now described with reference to FIGS. 2 to 6.

At first, a plurality of pole piece core elements 12 and ring core elements 13 are made with predetermined shapes and sizes. Each of the pole piece core elements 12 and each of the ring core elements 13 being shown in FIGS. 2A and 3A, for example, may be stamped out from lamellar plates. In this case, the outer diameter of each pole piece core element 12 and the inner diameter of each ring core element 13 are selected substantially equal to $\phi$. As may be apparent from FIG. 2A, the pole piece core element 12 has a plurality of pole teeth 14 extending radially outwards within its outer diameter $\phi$ and the inner ends of the pole teeth 14 are connected by a connecting ring 15. A V-shaped recess or cutout 15' is formed at one position of the inner periphery of the connecting ring 15 which recess will be described later, while, each ring core element 13 has the inner diameter $\phi$ as mentioned above and a predetermined outer diameter D. At predetermined positions of the outer periphery of each ring core 13, there are provided a plurality of projections 13' formed in recesses and used for positioning the ring core elements 13. These projections will be described later. A silicon steel plate may be suitable for the pole piece core element 12 and the ring core element 13.

Figure 2A:
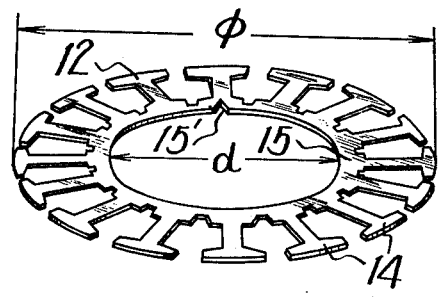
FIG. 2A is a perspective view showing a pole piece core element.
Figure 2B:
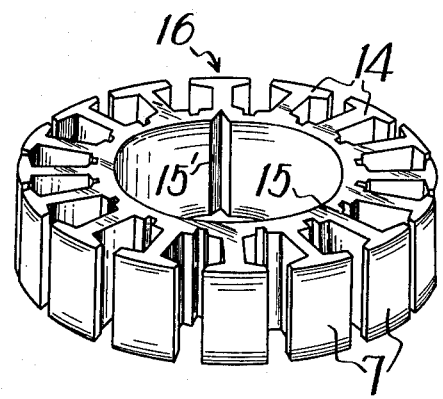
FIG. 2B is a perspective view showing a pole piece core made by laminating plurality of the pole piece core elements each shown in FIG. 2A and usable in the molded motor shown in FIG. 1.
Figure 3A:
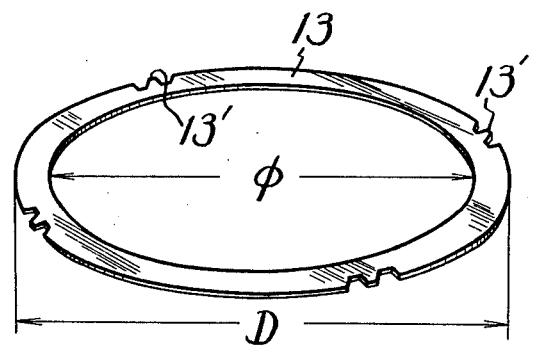
FIG. 3A is a perspective view showing a ring core element.
Figure 3B:
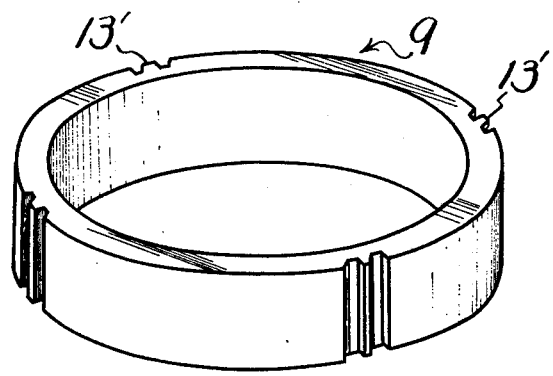
FIG. 3B is a perspective view showing a ring core made by laminating a plurality of ring core elements each shown in FIG. 3A and usable in the molded motor shown in FIG. 1.

FIG. 2B shows a pole piece body or core 16 which is made by laminating a number of the pole piece core elements 12, shown in FIG. 2A, each having an inner diameter $d$. In detail, a number of the pole piece core elements 12 are inserted into a laminating jig whose outer diameter is equal to $d$ and which has a projection along its axial direction corresponding to the V-shaped cutouts of the pole piece core elements 12 to be formed as the pole piece core 16. In this case, it is preferred that the laminated pole pieces be insulated with, for example, insulating sheets or insulating wax (not shown) for the coils wound thereon. It is, further, desired that the laminated pole piece core elements 12 may be welded so as to form a tight laminated body. In FIG. 2B, the laminated portions of the pole teeth 14 are marked with reference numerals 7 at the same positions in correspondence with FIG. 1.

A number of the ring core elements 13 can be laminated as the ring core or body 9 by means of a laminating jig (not shown) which has guide rails engaging with the projections 13' of the respective ring core elements 13 and means for arranging the inner diameters $\phi$ or outer diameters D of the respective ring core elements 13. In this case, all the ring core elements 13 forming the laminated ring core or body 9 are preferably welded as an integral body.

Then, coils 8 are wound on the pole tooth portions 14 of the laminated pole piece core 16 by means of, for example, well known winding apparatus.

Figure 4:
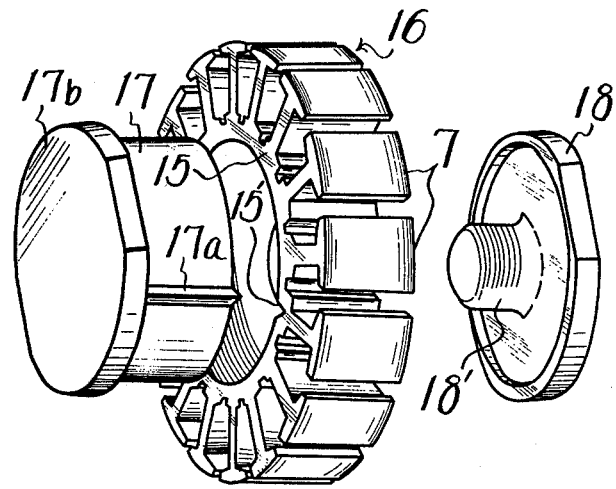
FIG. 4 is a schematic perspective view used for explaining a coil winding jig.

With reference to FIG. 4, a jig which may be used for installing the core 16 on an automatic winding machine or coil inserting machine will be now described. The jig is something like a mandrel. The mandrel consists of a male shaft 17 having an extending projection 17a, which may engage with the cutouts 15 of the laminated pole piece body 16, and a flange 17b at its one end to which a spanner is latched, and of a clamping tool 18 having a screw 18' to be screwed into the other end of the male shaft 17. The laminated pole piece body 16 is fitted onto the male shaft 17, then firmly held thereto by the clamping tool 18. Then, the jig or mandrel is loaded on a winding machine or coil inserting machine for winding the coils 8 on the pole tooth portions 14 of the laminated pole piece body 16. Since the coil winding machine used in the present invention is well known and the shape and so on of the coils wound thereby are substantially similar to those well known, the process for winding the coils 8 is omitted from the description and the coils themselves are also not shown for the sake of brevity.

Figure 7:
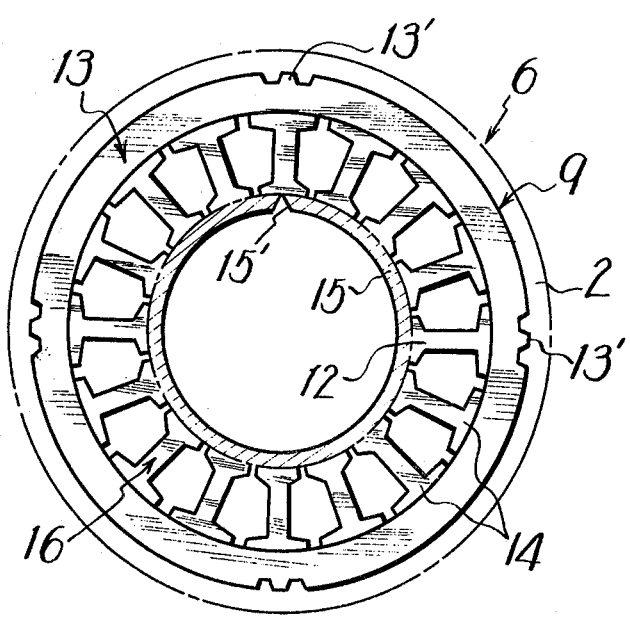
FIG. 7 is a plan view of a stator made by the method of the present invention.

Then, as may be apparent from FIG. 1, the laminated pole piece body 16 made of a number of the pole piece core elements 12 and having the coils 8 is urged into the inside of the laminated ring core body 9 integrally therewith. In this case, since each of the pole piece core elements 12 and each of the ring core elements 13 are formed by stamping out of the same lamellar plate, the firm and positive assembly of the laminated body 16 to the laminated body 9 can be carried out by arranging the laminated body 16 relative to the laminated body 9 in the same axis and then moving both the laminated bodies 16 and 9 relatively along the axis to be integrated together. The stator 6 thus assembled is shown in FIG. 7 in which the coils are omitted.

Figure 5:
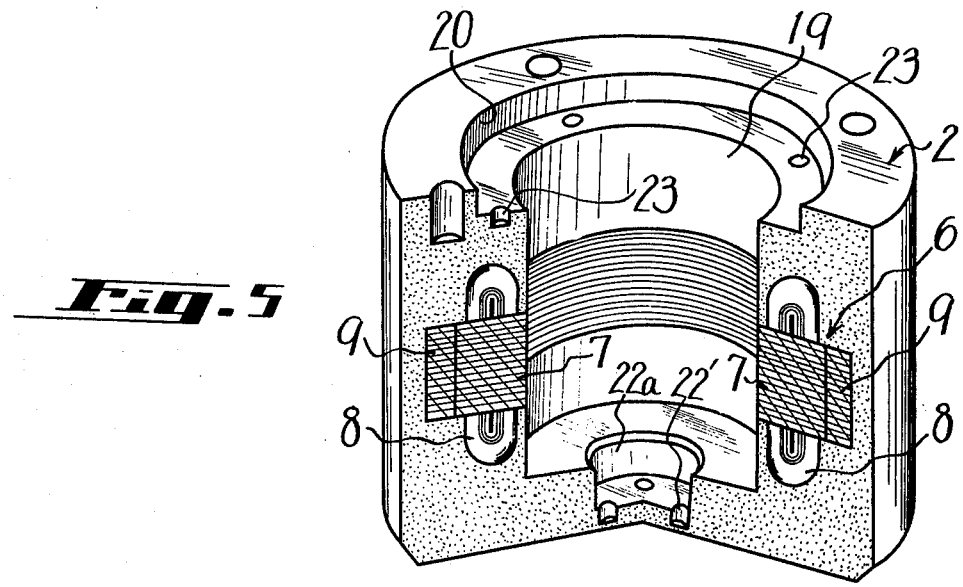
FIG. 5 is a perspective view, partially in cross-section, showing an embodiment of an inserting casing prepared by the method of the invention.

With the present invention, the above mentioned stator 6 or one similar to the stator 6 in construction is molded in the casing 2 shown in, for example, FIGS. 1 or 5 by the previously mentioned molding techinique to form a motor of high accuracy.

Before describing a molding compound of the type used in the invention, problems with respect to molding and molded goods of thermoplastic resin and thermosetting resin will be now described briefly. A molded body of thermoplastic resin is apt to be deformed due to the lack of its heat resistance and hence such a resin is not suited as a molding material for a motor or transformer. A thermosetting resin is superior to the thermoplastic resin in heat resistance, but it is difficult to obtain a molded body of thermosetting resin which reproduces the shape of a metal mold with high fidelity due to the lack of its fluidity upon molding. A molded body of thermosetting resin is brittle due to its property.

Further, a problem common to both the thermoplastic and thermosetting resins is that the contraction or shrinkage factor thereof (initial contraction factor and molded contraction factor) is great. In the case where the thickness of the molded body is not uniform, there is a fear that a crack may appear in the molded body at a thin portion and a cave-in may appear in the molded body at a thick portion.

According to the prior art method, since the resins which have the above mentioned problems are used, a highly accurate casing for a motor can not be obtained only by molding with such resins.

In the present invention, a resin having a composition, which will be described later as an example, is used as a material for the motor casing 2 and the bracket 5 for the motor casing 2.

An example of the resin composition

| | |
|---|---|
| Unsaturated polyester resin (monomer): 80 W% | (I) |
| Polystyrene or acrylic resin (polymer): 20 W% | (II) | where the unsaturated polyester resin is thermosetting, but the polystyrene or acrylic resin is thermoplastic.

In accordance with the invention, the above composition of resin in which a suitable amount of the thermoplastic resin is mixed with the thermosetting resin is used to form the motor casing 2 by injection molding technique in which the above mentioned stator 6 is molded. However, the process for preparing the stator 6 and its construction, which is shown in FIG. 7 and described previously, are also important. As mentioned above, the plural teeth 14 or the pole pieces 7 of each pole piece element 12 are coupled together by the connecting ring 15 in the laminated body 16. Therefore, it is preferred that the connecting rings 15 in the molded casing 2 be cut out except that they are adequately short in the radius direction.

In practice, in the present invention it is necessary that several filling materials be added to the above composition of the thermosetting and thermoplastic resins when the resin composition is actually used. These filling materials are kinds of fillers such as calcium carbonate or aluminum oxide and fibers such as chopped strands.

With reference to FIG. 5, a practical embodiment of the molded casing 2 made by the invention, in which the stator 6 is inserted, will be described. Further, means for removing the connecting rings 15 and the functions of the fillers will be also described.

Firstly, the stator 6 is located in a metal molding box which is formed to have a predetermined shape, size and so on. Then the metal molding box is loaded on a injection molding machine, and a mixture of resin having the above composition with a filler such as calcium carbonate (or aluminum oxide) by weight parts of 30~80 are injected in a molten state into the metal molding box to form the casing 2 shown in FIG. 5. In this case, the ratio of the filler to the resin is preferred in the above range.

In the above molding of the casing 2, the monomer (I) will shrink upon heating but the polymer (II) will swell with the result that the resin composition used in this invention reaches a state of relative equilibrium. Thus, the volume change of the resin that would occur during molding process is substantially avoided. In addition, the initial and molded shrinkage or contraction of the resin after being released from the metal molding box are avoided by the filler which is already added to or mixed with the resin. Such a filler has the function that it decreases the thermal expansion coefficient of resin as the amount of filler added to the resin increases. Thus, it will be apparent that the casing 2 formed in this way is superior in accuracy and is changed less by the lapse of time.

Figure 6:
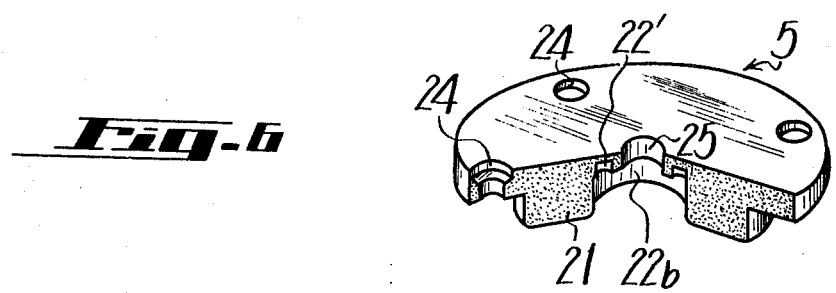
FIG. 6 is a perspective view, partially in cross-section, showing an embodiment of a bracket prepared by the invention.

The bracket 5 shown in FIG. 6 is made of similar material and by a similar method as the casing 2, so that the bracket 5 has advantages similar to those of the casing 2.

Upon molding the casing 2 and the bracket 5 from the above-described resin by the present invention, pigment, hardening compound, releasing agent and so on similar to those known heretofore are used also.

The casing 2 made by the method of the present invention has no bracket at one end of an opening 19 for receiving the rotor 3 therethrough in the casing 2 as shown in FIG. 5. Instead, a step portion 20 is formed on the casing 2 along the periphery of the opening 19 as shown in FIG. 5 and the bracket 5 is attached to the casing 2 at the step portion 20. In FIG. 6, reference numeral 21 designates an insertion projection formed on the inner surface of the bracket 5. A concave portion 22b is provided for receiving a bearing (ball bearing or oilless bearing and not shown) which will rotatably support the rotary shaft 4 of the motor 1 (refer to FIG. 1). Also provided is a plurality of holes 22' which extend from the concave portion 22b, and another set of bores 24 through which the bolts or screws 11 pass to hold the bracket 5 on the casing 2. Finally the bracket 5 includes a bore 25 through which the rotary shaft 4 extends. In FIG. 5, there is a concave portion 22a for receiving a bearing (ball bearing or oilless bearing not shown) which will rotatably support the rotary shaft 4, holes 23 formed in the casing 2 and receiving inserted ends of the screws 11 and holes 22', which are similar to the holes in FIG. 6. Further, in FIG. 5 reference numerals the same as those used in FIG. 1 represent the same parts.

As shown in FIG. 7, the connection ring 15 of the stator 6 which is inserted into the casing 2 extends inwardly from the inner surface of the opening 19 (refer to FIG. 5 in which, however, the connecting ring 15 is not shown). As may be apparent from FIGS. 1 and 5, the connecting ring 15 is entirely unnecessary in the completed casing 2 or the motor 1, so that all the connecting rings 15 must be removed. An example of the means to remove the connecting rings 15 is as follows. The casing 2 is loaded on an ordinary machine tool and then the connecting rings 15 are cut out or reamed out so that the radially innermost ends of the teeth 14 become flush with the inner surface of the opening 19 for the rotor 3. That is, the connecting ring 15 is cut away as shown in FIG. 7 by the cross-hatched portions, and accordingly the pole piece 7 or pole teeth 14 are separated from one another. Thus, the stator 6 is completed. Though not shown, terminals of the coils 8 extend through the casing 2.

Bearings (not shown) are assembled to the casing 2 and the bracket 5 in the concave portions, or recesses, 22a and 22b, then the rotor 3 is inserted through the opening 19 into the casing 2 so that its rotary shaft 4 is rotatably supported by the bearings at the casing and bracket, respectively, and then the bracket 5 is inserted in the casing 2 at its step portion 20 and screwed down. Thus, the motor 1 shown in FIG. 1 is completely assembled.

As may be apparent from the above description, with the present invention the shrinkage or contraction and distortion of the motor casing and bracket can be much reduced during the molding process thereof and after the process being finished. Thus, the motor 1 made according to the method of the present invention can be free from the defects inherent in the prior art motor.

It will be apparent that many modifications and variations could be effected by one skilled in the art without departing from the spirits or scope of the novel concepts of the present invention, so that the scope of the invention should be determined by the appended claims.

We claim as our invention:
1. A method for making a stator structure for a motor, said method comprising the steps of:
  A. providing a stack of first ferromagnetically soft rings, each of said rings comprising an innerconnecting ring portion and a plurality of teeth portions extending outwardly from the respective interconnecting ring portion;
  B. disposing a plurality of coils around said teeth portions;
  C. providing a stack of second ferromagnetically soft rings;

D. inserting said stack of first rings with said coils disposed around said teeth portions into said stack of second rings;

E. molding the combined stacks of first and second rings with a dimensionally stable resin mixture of thermosetting resin and thermoplastic resin to hold said first and second rings rigidly together to form a motor casing structure entirely enclosing said rings and said coils and comprising a recess coaxial with said rings and extending inwardly from one end of said casing structure to permit a rotor to be inserted therein, said casing structure comprising an integrally molded section at the other end thereof having a first concave portion formed therein coaxial with said recess to hold bearing means to provide a first accurately placed receptacle for supporting one end of the rotor;

F. molding a bracket of said dimensionally stable resin mixture to attach to said one end of said casing structure to close said recess, said bracket being molded to have a second concave portion to provide a second accurately placed bearing receptacle for supporting the other end of the rotor; and G. assembling said bracket and said casing structure together such that said first and second concave portions are aligned to support said rotor.

2. The method of claim 1 comprising the step of removing the radially innermost part of said connecting ring portion of said motor casing structure to separate ferromagnetic connection between said teeth portions.

3. The method of claim 1 in which said thermosetting resin comprises about 80% by weight of said resin mixture and said thermoplastic resin is about 20% by weight of said resin mixture.

4. A stator structure made according to the method of claim 1.

* * * * *